April 8, 1958 E. G. TOGSTAD 2,829,532

REVERSING MECHANISM FOR LONGITUDE AND LATITUDE NAVIGATION COUNTER

Filed June 28, 1956 6 Sheets-Sheet 1

INVENTOR.
ERLING G. TOGSTAD
BY
Theodore H. Lassagne
ATTORNEY

April 8, 1958 E. G. TOGSTAD 2,829,532

REVERSING MECHANISM FOR LONGITUDE AND LATITUDE NAVIGATION COUNTER

Filed June 28, 1956 6 Sheets-Sheet 2

INVENTOR.
ERLING G. TOGSTAD

BY

Theodore H. Lassagne
ATTORNEY

INVENTOR.
ERLING G. TOGSTAD
BY
Theodore H. Lassagne
ATTORNEY

April 8, 1958 E. G. TOGSTAD 2,829,532

REVERSING MECHANISM FOR LONGITUDE AND LATITUDE NAVIGATION COUNTER

Filed June 28, 1956 6 Sheets-Sheet 4

INVENTOR.
ERLING G. TOGSTAD

BY

Theodore H. Lassagne

ATTORNEY

INVENTOR.
ERLING G. TOGSTAD
BY Theodore H. Lassagne
ATTORNEY

April 8, 1958 E. G. TOGSTAD 2,829,532
REVERSING MECHANISM FOR LONGITUDE AND LATITUDE NAVIGATION COUNTER
Filed June 28, 1956 6 Sheets-Sheet 6
FIG. 13
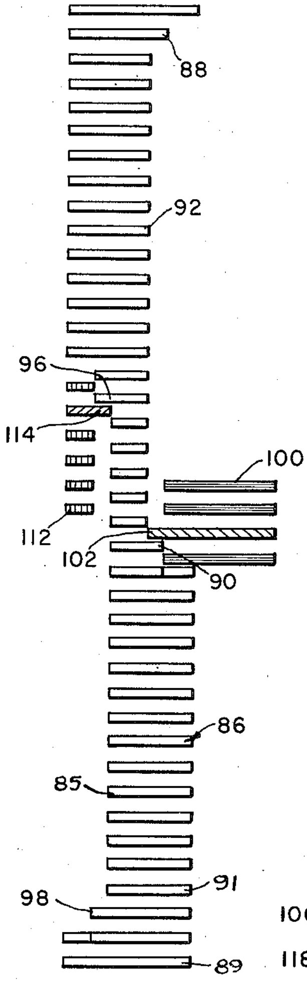
FIG. 12
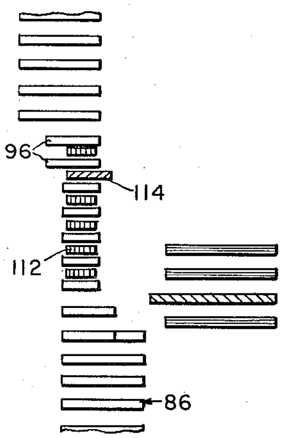
FIG. 14
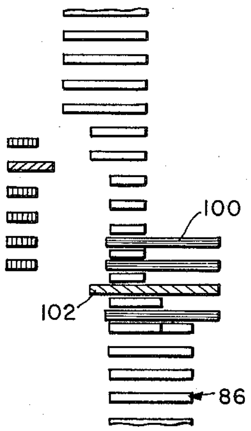
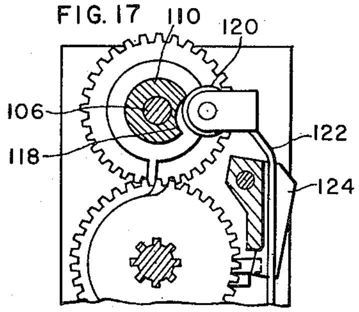
FIG. 15, FIG. 16
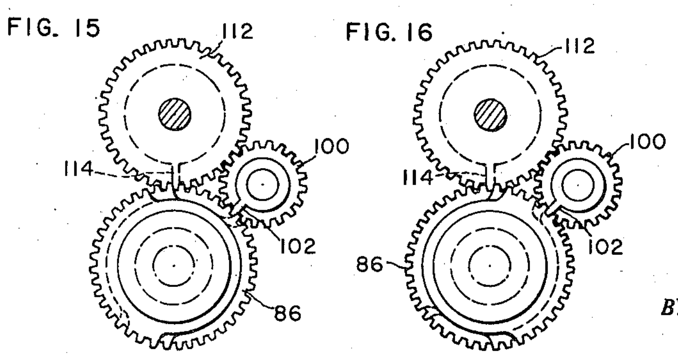
INVENTOR.
ERLING G. TOGSTAD
BY Theodore H. Lassagne
ATTORNEY 2,829,532

REVERSING MECHANISM FOR LONGITUDE AND LATITUDE NAVIGATION COUNTER

Erling G. Togstad, La Crescenta, Calif., assignor to Librascope, Incorporated, Glendale, Calif., a corporation of California Application June 28, 1956, Serial No. 594,551

11 Claims. (Cl. 74—321)

This invention relates to reversing apparatus and more particularly to apparatus for driving an output shaft in one direction during a particular number of revolutions of an input shaft and for driving the output shaft in the opposite direction during the next number of revolutions of the input shaft.

In recent years, apparatus has been built for controlling the flight of various vehicles such as airplanes so that the airplane can be accurately guided to a distant position such as an airport at a distant city. In order to provide such accurate guidance, the direction of the airplane flight at any instant must be accurately known. In some systems, the direction of airplane flight is measured so that angular increments from a particular direction such as true north are initially represented by increases in output indications.

After an angle of 180 degrees has been reached, further angular increments are represented by decreases in the output indications. In this way, an indication of 0 degrees is approached as the angular direction of north is approached either from a southeast direction or a southwest direction. By providing such indications, crossovers between 360 degrees and 0 degrees cannot occur as the indications fluctuate alternately in a southeastern direction from true north and then in a southwestern direction from true north.

Various attempts have been made to build apparatus for counting upwardly for particular values and for counting downwardly for subsequent values. Such apparatus has not been entirely successful for several reasons. One problem has resulted from the difficulty in reversing members without obtaining lost motion of the various parts to produce errors in the measurements. Another problem has resulted from the difficulty in building the apparatus with a minimum number of parts so that the apparatus can respond quickly to changes in value and so that the apparatus can be housed in a small space.

This invention provides apparatus for overcoming the above difficulties. The invention includes an input shaft rotatable in accordance with changes in the direction in which a control member such as a compass needle is pointing. The input shaft drives a cam having a semi-annular undercut portion and a semi-annular overcut portion. The cam controls the axial positioning of a control member along a shaft. When the undercut portion of the cam is presented, the control member is shifted axially toward the left along the shaft. The control member is shifted axially toward the right along the shaft when the overcut portion of the cam is presented.

The control member has first and second gear portions each with a semi-annular configuration. The first gear portion engages a first gear mounted on an output shaft and drives the gear in one direction when the control member has been shifted axially toward the left. The second gear portion on the control member engages a second gear upon an axial movement of the control member toward the right and drives the second gear. The second gear is in mesh with the first gear and drives the first gear in a direction opposite to the movement of the first gear when the first gear is in mesh with the first gear portion on the control member. Hunting teeth are included on the first and second gears and on the first and second gear portions of the control member to provide for a proper engaging and disengaging relationship between the various gears and gear portions.

In the drawings:

Figure 12 is an enlarged fragmentary developed view of certain gears shown in the previous figures as seen from a front elevational position and particularly illustrates the relative disposition of various teeth in these gears including hunting teeth in one relationship of the gears;

Figure 13 is an enlarged developed view of the gears shown in Figure 12 as seen from a front elevational position and particularly illustrates the relative disposition of the teeth in these gears including hunting teeth in a second relationship of the gears;

Figure 14 is an enlarged fragmentary developed view of the gears shown in Figures 13 and 14 as seen from a front elevational position and particularly illustrates the relative disposition of the teeth in these gears including hunting teeth in a third relationship of the gears;

Figure 15 is a side elevational view of certain gears including the gears shown in Figures 12, 13 and 14 and particularly illustrates the relative disposition of the hunting teeth on the gears in a first operative disposition of the gears;

Figure 16 is a side elevational view of the gears shown in Figure 15 as seen from a position similar to that shown in Figure 15 and particularly illustrates the relative disposition of the hunting teeth on the gears in a second operative disposition of the gears; and Figure 17 is an enlarged schematic view illustrating the operation of certain members shown in Figures 2 and 9.

Figure 1:
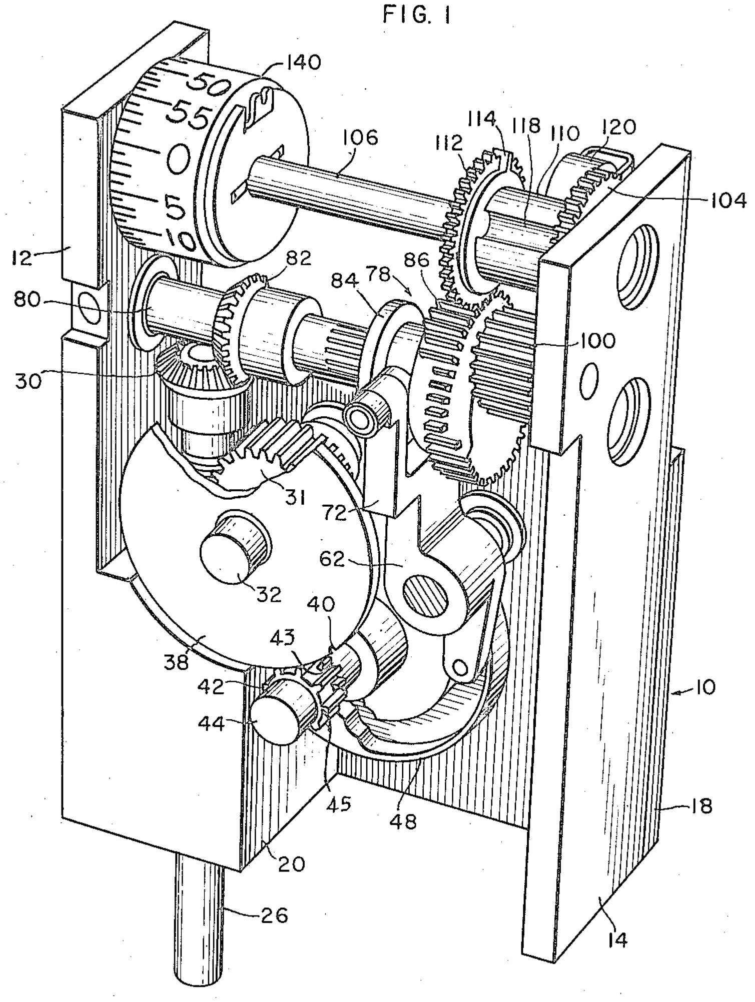
Figure 1 is a perspective view of the reversing apparatus constituting this invention as seen from a position in front of the apparatus, certain members being broken away and certain members being omitted to show other members in some detail.

In the embodiment of the invention shown in the drawings, a housing generally indicated at 10 (Figures 1 and 2) is formed from a pair of side walls 12 and 14 and from front and back walls 16 and 18. A shelf portion 20 (Figure 3) extends inwardly from the side wall 12 along a portion of the distance toward the side wall 14. The shelf portion 20 extends upwardly from the bottom of the side wall 12 to an intermediate position along the side wall in the vertical direction.

An input shaft 26 (Figure 3) is positioned within a vertical hole 24 in the shelf portion 20 and is adapted to rotate in bearings 27 suitably supported by the shelf portion within the hole 24. The input shaft 26 may be rotated by various control apparatus such as mechanisms for indicating the relative disposition of the pointer in a compass. For example, the input shaft 26 may be rotated to indicate the degree of variation of the compass from a north-south line. The input shaft 26 may also be rotated to indicate the degree of variation of the compass from an east-west line.

Figure 7:
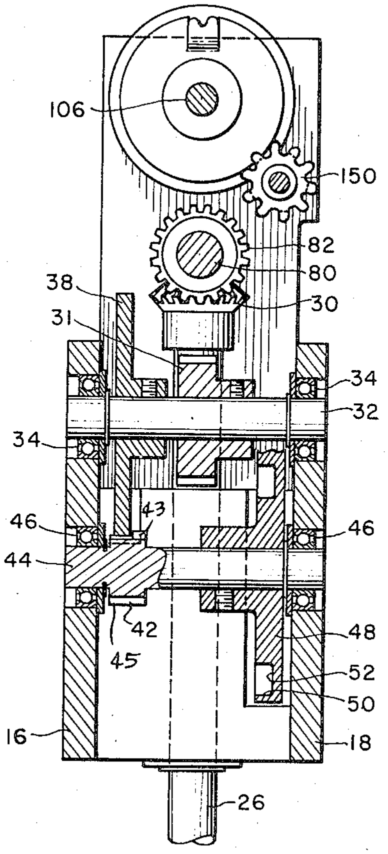
Figure 7 is a sectional view substantially on the line 7—7 of Figure 3.

The input shaft 26 has a worm portion 28 at a position above the top of the shelf portion 20. The input shaft 26 also carries a bevel gear 30 at its upper end, the bevel gear being fixedly positioned on the shaft as by a screw 29. The worm portion 28 of the input shaft 26 is in mesh with a worm gear 31 mounted on a shaft 32, which is adapted to rotate on bearings 34 (Figures 7 and 8) such as ball bearings supported within the front and back walls 16 and 18. The worm gear 31 is provided with a particular number of teeth such as 45 teeth and is associated with the worm portion 28 so as to rotate through one complete revolution upon 45 complete revolutions of the shaft 26.

A Geneva gear 38 is also carried by the shaft 32 and is provided with a single tooth 40 on its periphery and a conventional mutilated tooth 41 on its inside coinciding with said tooth 40. The single tooth 40 on the gear 38 is defined by an indentation in the periphery of the gear. The mutilated tooth 41 is adapted to mesh with the teeth 43 of a pinion 42. In order to provide the ratio desired in the form illustrated, 8 teeth are used. Typical of the Geneva movement used herein, an outside row of teeth 45 is also provided which bears against the periphery of gear 38 to prevent backlash. Teeth 45 are alternately spaced in front of and between teeth 43. Because of the particular construction of the gear 38, the pinion 42 is adapted to be rotated through a complete revolution upon eight full revolutions of the gear 38. The pinion 42 is mounted on a shaft 44 which extends between the front wall 16 and the back wall 18 of the housing. The shaft 44 is adapted to rotate in bearings 46 (Figures 7 and 8) supported by the front wall 16 and the back wall 18.

A cam 48 is mounted on the shaft 44 for rotation with the shaft. The cam 48 has a pair of faces 50 (Figure 7) separated from each other by an indented portion 52. The indented portion 52 of the cam 48 is provided with a configuration corresponding to that of the faces 50 in the annular direction. The inner face 50 may be considered as being divided into an overcut portion 54 (Figure 3) and an undercut portion 56. Each of the portions 54 and 56 has an angular length of approximately 180 degrees and has a substantially constant radius through most of its length. The undercut portion 56 has a greater radius than the overcut portion 54. At the positions joining the undercut portion 54 and the overcut portion 56, the inner face 50 is provided with portions 58 having a radius intermediate the radii of the portions 54 and 56. The intermediate portion 58 may have a relatively short angular length.

Figure 5:
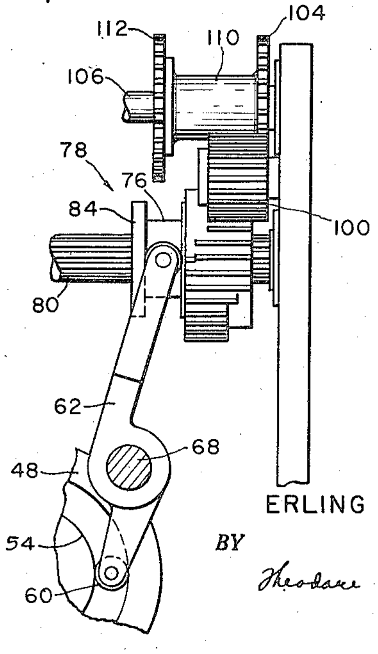
Figure 5 is a fragmentary sectional view of the members shown in Figures 3 and 4 as seen from a position similar to that shown in Figures 3 and 4 and illustrates the relative disposition of these members in a third relationship between the cam and the cam follower.
Figure 6:
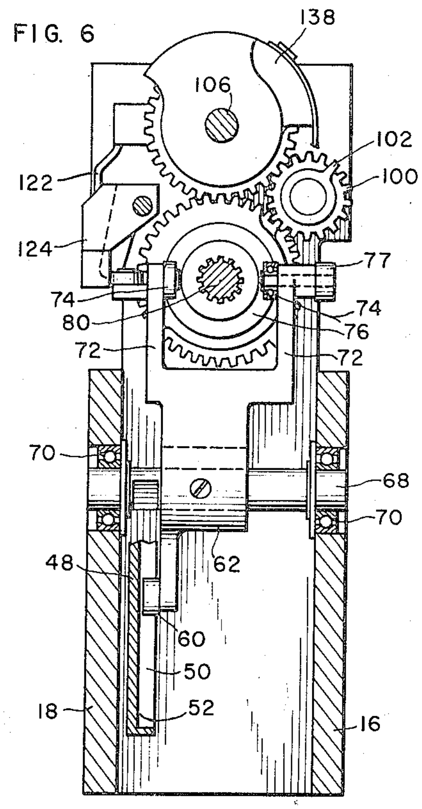
Figure 6 is a sectional view substantially on the line 6—6 of Figure 3.
Figure 8:
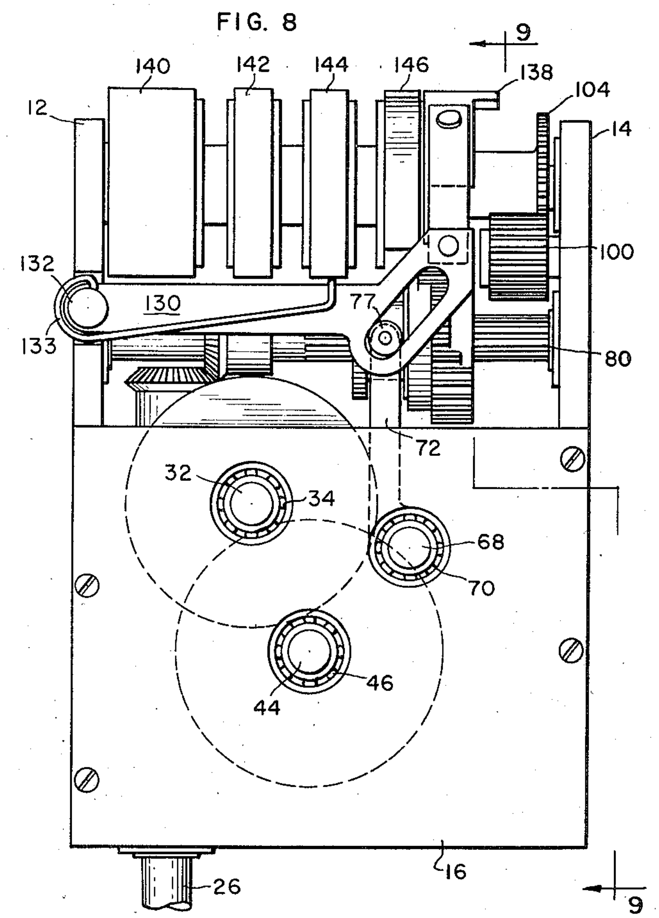
Figure 8 is a front elevational view of the reversing apparatus.

A cam follower roller 60 at one end of a cam follower 62 is adapted to ride in the indented portion 52 of the cam 48. The cam follower 62 is pivotable on a pin 68 at an intermediate position along its length. The pin 68 is disposed between the front wall 16 and the back wall 18 of the housing and is rotatable in bearings 70 supported by the walls. At its upper end, the cam follower 62 is yoked to provide a pair of parallel legs 72 (Figures 6 and 8). Rollers 74 are supported on pins which extend through the legs 72 at the upper ends of the legs. The rollers 74 are freely rotatable relative to the legs by including roller bearings between the pins and the rollers. The rollers 74 extend toward each other from the legs 72 and engage at diametrically opposed positions a throat portion 76 (Figures 3, 4 and 5) of a control member generally indicated at 78. A roller 77 is also mounted on one of the pins extending through the legs 72 so as to be disposed in coaxial relationship with the roller 74 mounted on the pin.

The control member 78 is mounted on a splined shaft 80 for axial movement along the shaft and for rotary movement with the shaft. The bevel gear 82 is also mounted on the shaft 80 in coupled relationship to the gear 30 and is provided with 24 teeth when the gear 30 is provided with 21 teeth. The shaft 80 is disposed between the side walls 12 and 14 and is rotatable within bearings 83 supported by the side walls.

The throat portion 76 of the control member 78 is defined at one end by a flange portion 84 and at the other end by a gear designated generally as 86 and having a portion 85. As may be best seen in Figure 13, the portion 85 extends through an angular distance of approximately 180 degrees and has hunting teeth 98 and 90 at opposite ends of the gear portion. The hunting teeth 98 and 90 have an axial length shorter than the length of the longest tooth 89 and longer than tooth 91. The gear portion 85 is displaced axially, as best shown in Figure 12, away from the throat 76.

The gear portion 85 is integral with a gear portion 92 and these two portions together extend through the complete annular periphery of the control member 78. The gear 86, consisting of portions 85 and 92, has a particular number of teeth such as 40 teeth. The gear portion 92 is axially displaced from the gear portion 85 in a direction toward the throat portion 76. The gear portion 92 has a semi-annular configuration corresponding to that of the gear portion 85 and has a pair of hunting teeth 96 and 88 at the ends of the semi-annular configuration.

The teeth 96 and 88 have an axial length corresponding to the teeth 90 and 98.

A spur gear 100 is adapted to mesh with the gear portion 85 in one axial position of the control member 78. The spur gear 100 is provided with a particular number of teeth such as 20 teeth. The spur gear 100 has a hunting tooth 102 which extends axially from the spur gear in a direction toward the gear portion 92. The spur gear 100 is in mesh with a spur gear 104 having a particular number of teeth such as 40 teeth. The spur gear 104 is fixedly mounted on a shaft 106 (Figures 3, 4 and 5) extending between the side walls 12 and 14. The shaft 106 is adapted to rotate in bearings 108 supported by the side walls 12 and 14.

The spur gear 104 is integral with one end of a collar portion 110 and a spur gear 112 is integral with the other end of the collar portion 110. The spur gear 112 is disposed to engage the gear portion 92 in one axial position of the control member 78. A hunting tooth 114 extends axially from the spur gear 112 in a direction toward the gear portion 92.

A detent 118 (Figures 1 and 9) is provided in the collar portion 110 at one annular position in the collar portion. A roller 120 (Figures 2 and 9) is adapted to fit in the detent 118 in certain revolutions of the collar portion 110. The roller 120 is fastened to one end of a leaf spring 122 having its other end fastened to the rear wall 18. An actuator 124 (Figures 2, 9 and 10) is mounted to bear intermittently against the leaf spring 122. The actuator 124 has a cupped portion 126 (Figure 10) which is adapted to cooperate with a roller 128 on the cam follower 62 to control the lateral positioning of the actuator and the leaf spring 122.

A slide bar 130 (Figures 8 and 11) is mounted on a pin 132 for pivotal movement relative to the pin against the action of a coiled spring 133. The slide bar 130 is provided with a slot 134 obliquely disposed relative to the shaft 80. The slot 134 receives the roller 77 supported by the cam follower 62. Because of the cooperative relationship between the slot 134 and the roller 77, the slide bar 130 becomes pivoted upon an axial movement of the roller along the shaft 80 in a direction toward the left or right in Figures 8 and 11. The slide bar 130 is attached at its upper end to one end of a flexible rod 136 having its other end attached to a flag 138 shaped in an annular segment. The flag 138 is provided with a pair of designations such as "East" and "West" or "North" and "South" to denote the pivotal disposition of the indicator. The flag 138 is positioned above the collar portion 110 mounted on the shaft 106.

Figure 2:
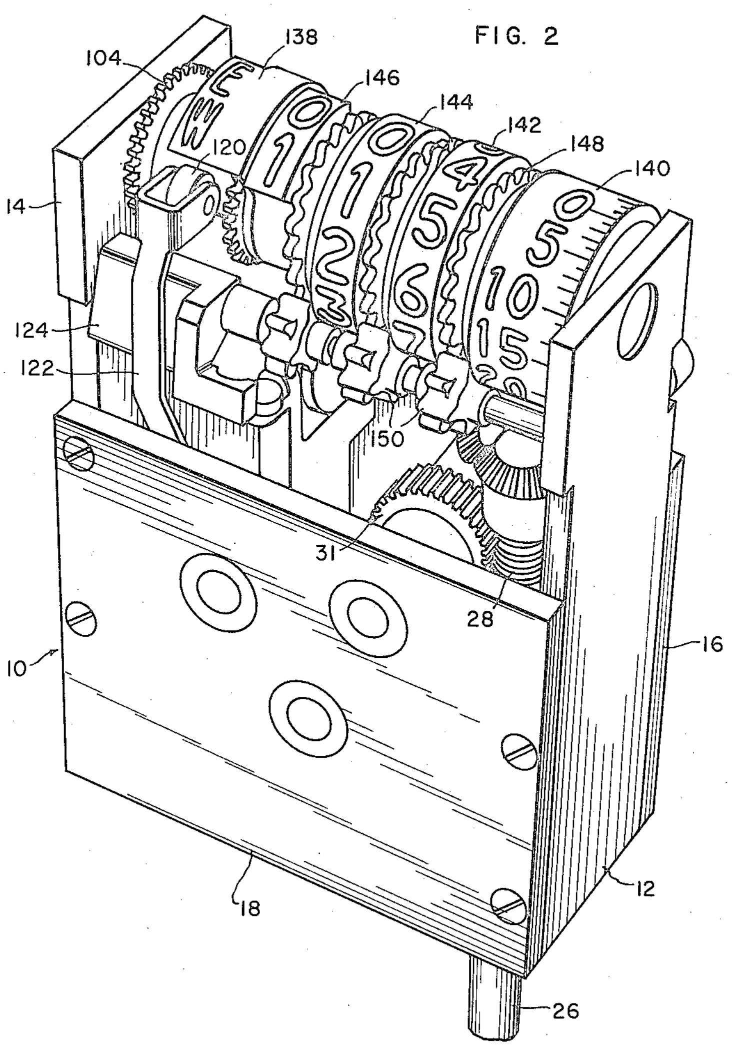
Figure 2 is a perspective view of the apparatus shown in Figure 1 as seen from a position to the rear of and somewhat above the apparatus and shows in some detail certain members not included in Figure 1.
Figure 3:
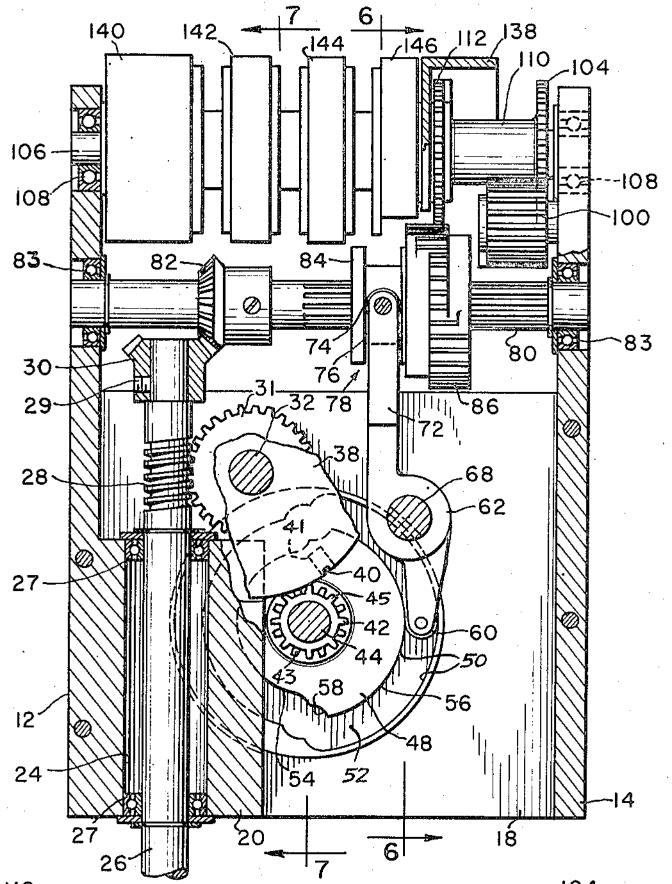
Figure 3 is a sectional view of the apparatus shown in Figures 1 and 2 as seen from a front elevational position and illustrates the relative disposition of certain members in one relationship between a cam and a cam follower.

Other members are mounted on the shaft 106 in addition to the collar portion 110 and the gears 104 and 112 integral with the collar portion. These members include cylinders 140, 142, 144 and 146 (Figures 2, 3 and 8). The cylinder 140 is fixedly mounted on the shaft 106 and the cylinders 142, 144 and 146 are loosely mounted on the shaft. Gears 148 and pawls 150 (Figure 2) are associated with the cylinders 140, 142, 144 and 146 so that each of the successive cylinders becomes driven through a particular angular distance upon each complete rotation of the preceding cylinder. The association between the cylinders and the gears 148 and the pawls 150 is well known in the art. Complete assemblies of cylinders, gears and pawls may be obtained from the Veeder-Root Company of Hartford, Connecticut.

The cylinder 140 may be provided with numerical indications between "0" and "60" to represent the number of minutes in a degree when the bearings of a moving member such as an airplane are being measured. The cylinders 142 and 144 may be provided with numerical indications between "0" and "10" (best seen in Figure 2) to represent the values of the units and tens digits for the number of degrees in an angle when the bearing is being measured. The cylinder 146 may be provided with indications of only "0" and "1" to represent the value of the hundreds digit since the maximum value capable of being measured by the apparatus is 180 degrees.

As previously described, the input shaft 26 in Figures 1, 2 and 3 may be rotated in accordance with the movements of the needle on a compass to indicate the direction in which the needle is pointing. For example, the shaft 26 may be rotated through one complete revolution every time that the needle on the compass changes by one degree. Every time that the input shaft 26 rotates through one complete revolution, the worm portion 28 (Figure 3) on the shaft operates on the worm gear 31 to rotate the worm gear through an angular distance equivalent to one tooth. In this way, the worm gear 31 rotates through one revolution for every 45 revolutions of the shaft 28.

The gear 38 rotates with the worm gear 31. In each revolution of the gear 38, the gear operates to advance the pinion 42 through one-eighth of a revolution. This results from the mutilated tooth 41 meshing with one of the eight teeth 43 on the gear 38. Since the pinion 42 has eight teeth 43, it rotates through one complete revolution in every eight revolutions of the gear 38. In this way, the pinion 42 rotates through one complete revolution in every $8 \times 45 = 360$ revolutions of the input shaft 26 because of the 45:1 ratio between the worm portion 28 and the worm gear 31.

Since the cam 48 is mounted on the shaft 44 with the pinion 42, it rotates with the pinion. As the cam 48 rotates, the overcut portion 54 and the undercut portion 56 alternately become presented to the cam follower 62 (best seen in Figures 3, 4 and 5). When the overcut portion 54 is presented to the cam follower 62, as shown in Figure 5 the cam follower pivots in a clockwise direction on the pin 68. This pivotal movement causes the control member 78 to move axially toward the right to the position shown in Figure 5. In like manner, the cam follower 62 pivots in a counterclockwise direction on the pin 60 upon the presentation of the undercut portion 56 to the cam follower. This pivotal movement of the cam follower 62 causes the control member 78 to be moved axially toward the left to the position shown in Figure 3.

Figure 4:
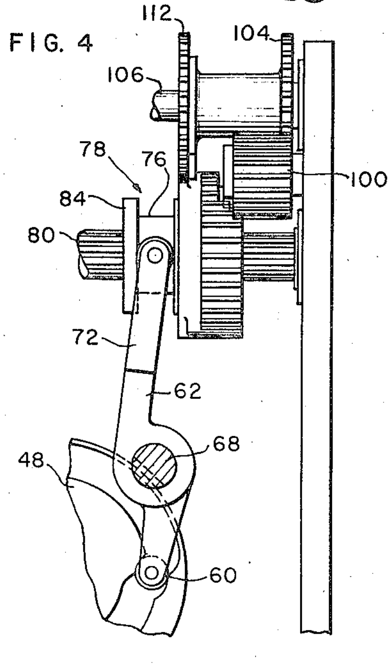
Figure 4 is a fragmentary sectional view of certain members shown in Figure 3 as seen from a position similar to that shown in Figure 3 and illustrates the relative disposition of these members in a second relationship between the cam and the cam follower.

As the cam follower 62 rides along one of the intermediate portions 58 on the cam 48, the control member 78 moves axially to the intermediate position shown in Figure 4 which moves the gears into the position shown in Figure 13. This axial movement is insufficient initially to produce a fully meshed relationship between the gear portion 85 and the spur gear 100. However, at this moment the hunting tooth 90 engages the hunting tooth 102. Because of the engagement between the hunting teeth 90 and 102, an initial movement is imparted to the spur gear 100 in a clockwise direction in Figure 15 and in an upward direction in Figure 13.

As may be seen in Figure 17, the roller 120 is positioned against one corner of the detent 118 in the collar portion 110 at the time that the control member 78 is moved axially toward the right by virtue of the roller 60 rolling into the portion 58, shown in Figure 4. This causes the roller 120 to press against the corner of the detent 118 to impart an additional impetus to the rotary movement of the spur gear 100 in a reverse direction. At the next instant the roller 120 and the detent 118 cause the teeth on gear 105 to assume proper alignment for meshing with hunting tooth 90 and the subsequent teeth on gear portion 85.

Immediately after the hunting tooth 90 engages the hunting tooth 102, the roller 60 rides along the intermediate portion 58 of the cam 48 from the intermediate portion 58 to the overcut portion 54 (the cam 48 at this point being approximately 100° from that shown in Figure 3). This produces a further pivotal movement of the cam follower 62 in a clockwise direction and causes the control member 78 to move axially toward the right through a further distance. In this way, the cam follower 62 and the control member 78 move from the positions shown in Figure 4 to the position shown in Figure 5.

Upon this movement of the control member 78 toward the right in Figure 4, the gear portion 85 fully engages the spur gear 100 and produces a rotation of the spur gear. The spur gear 100 then is driven in accordance with the rotation of the input shaft 25 since it is coupled to the input shaft through the bevel gears 30 and 82.

After the input shaft 26 has rotated through approximately 180 revolutions, the other intermediate portion 58, disposed 180° from the portion 58 shown in Figure 4 on the cam 48 becomes positioned in contiguous relationship to the roller 60. This causes the cam follower 62 to pivot in a counterclockwise direction as the cam advances from the overcut portion 54 to the intermediate position shown in Figure 4. The cam follower 62 in turn drives the control member 78 axially toward the left through an intermediate distance along the splined shaft 80. As the control member 78 moves axially toward the left, the gear portion 92 on the control member becomes uncoupled from the spur gear 100. This may be seen from the fact that the relationship between the gear portion 92 and the spur gear 100 is similar to that shown in Figure 13, because the gear 86 is all moving from right to left.

At approximately the same time that the hunting tooth 102 on the gear 100 is clearing the hunting tooth 88 on the gear portion 86, the hunting tooth 98 on the gear portion 92 is engaging the hunting tooth 114 on the spur gear 112. This is best seen in Figure 16. This causes an initial rotary motion to be imparted to the spur gear 112. As the spur gear 112 starts to rotate, the cam 48 moves to a position in which the overcut portion 54 of the cam is contiguous to the roller 60. This causes the cam follower 62 to pivot further in a counterclockwise direction and the control member 78 to move further in a direction axially toward the left to the position shown in Figure 3. The additional movement of the control member 78 causes the gear portion 92 to mesh initially with the spur gear 112.

Since the spur gear 104 is constantly in mesh with the spur gear 100, the gears 104 and 112 rotate when the gear portion 92 meshes with the gear 100 in one direction and the opposite direction. The spur gear 112 is in mesh with the gear portion 92. This results from the fact that the spur gear 112 is driven through the gear 100 upon the engagement between the gear portion 92 and the gear 100 and is driven directly by the gear portion 92 upon its engagement with the gear portion. When the spur gear 112 is driven by the gear portion 92 indirectly through the gear 100, the spur gear 112 rotates through an angular distance corresponding to the angular distance moved by the gear when it is directly in mesh with the gear portion 92. In this way, the output shaft 106 has a reciprocal motion every time that the input shaft 26 rotates through 180 revolutions.

It may sometimes happen that the input shaft 26 may be rotated in a direction opposite to the direction described above. When this occurs, the output shaft 106 is initially driven in an opposite direction to that described above during the first 180 revolutions of the input shaft and is then driven in an opposite direction during the remaining 180 revolutions of the input shaft. During the reverse rotation of the input shaft 26 the aforementioned gear transfer is simply reversed.

It has been previously described that in every 180 revolutions of the shaft 106 the roller 120 engages the detent 118 in the collar portion 110 to drive the collar portion and the shaft 106 through an additional angular distance. As previously described, the purpose of imparting this additional angular movement to the shaft 106 and the collar portion 110 is to insure that the hunting teeth on the various members such as the control member 78 and the gears 100 and 112 will be moved to a position of clearance relative to one another in a first direction. In this way, rotation of the members such as the control member 78 and the gear 112 in the opposite direction can be properly initiated.

Since the shaft 106 and the collar portion 110 rotate through 180 revolutions in each direction before their movement becomes reversed in the opposite direction, the detent 118 moves 180 times past the roller 120. If the roller 120 were to engage the detent 118 during each revolution of the collar portion 110, a click would be heard every time that the detent moved past the collar portion. This could be considered as annoying, especially since the roller 120 does not have to engage the detent 118 in every revolution of the collar portion 110, but only once in every 180 revolutions of the collar portion, as described in the previous paragraph.

Certain members are included to insure that the roller 120 engages the detent 118 only once in every 180 revolutions of the collar portion so as to prevent unnecessary clicks from being heard. These members include the leaf spring 122, the actuator 124 and the roller 128. As may be best seen in Figure 10, the roller 128 presses against the actuator 124 to control the positioning of the actuator. The actuator 124 in turn acts upon the leaf spring 122 to control the positioning of the roller 120 relative to the collar portion 110.

Figure 9:
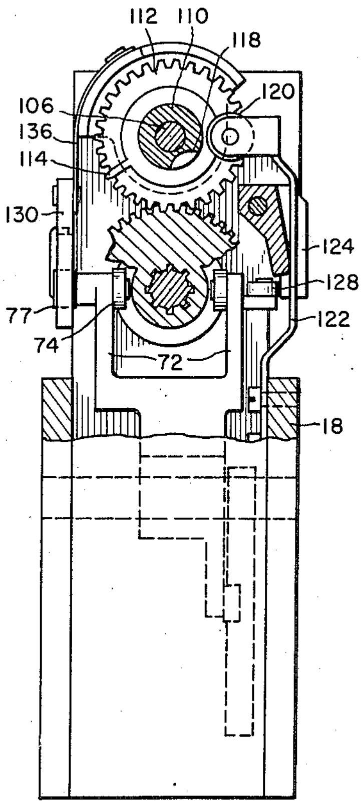
Figure 9 is a sectional view substantially on the line 9—9 of Figure 8.
Figure 10:
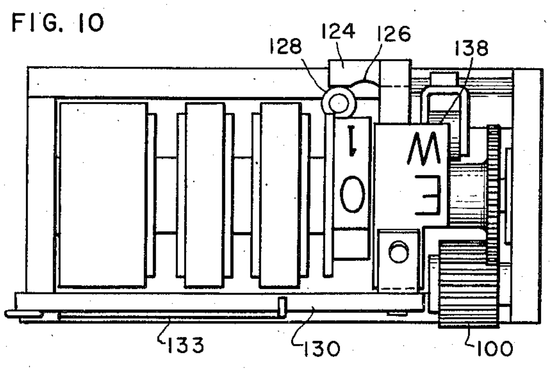
Figure 10 is a top plan view of the reversing apparatus.

The roller 128 normally positions the actuator 124 in a position corresponding to that shown in Figures 9 and 10 so as to maintain the roller 120 out of cooperative relationship with the collar portion 110. In every 180 revolutions of the collar portion 110, however, the roller moves toward the left or right in Figure 10 since it is coupled to the cam follower 62.

As the roller moves past the cupped portion 126 on the actuator 124, the actuator is able to move toward the left in Figure 9. Since the leaf spring 122 follows the movements of the actuator 124, the leaf spring also pivots toward the left in Figure 9. This causes the roller 120 to move into position for engaging the detent 118 on the collar portion 110, as may be best seen in Figure 17. The engagement between the roller 120 and the detent 118 is only momentary since the roller 128 continues its movement with the cam follower 62 so as to move instantaneously out of the cupped portion 126 in the actuator 124. This momentary engagement between the roller 120 and the detent 118 is sufficient to move the hunting teeth on the members such as the control member 78 and the gears 100 and 112 out of engagement so that movement of the control member and the gear 112 can be initiated in the opposite direction.

As the cam follower 62 pivots toward the left or right in Figure 8, the roller 77 moves along the slot 134 of the slide bar 130. This movement of the roller 77 causes the slide bar 130 to pivot upwardly or downwardly between the positions shown in Figures 8 and 11. The slide bar 130 pivots on the pin 132 as a fulcrum and against the action of the spring 133.

Figure 11:
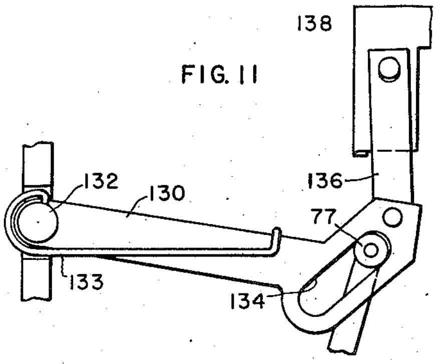
Figure 11 is a fragmentary front elevational view of certain members as seen from a viewpoint similar to that shown in Figure 8 but illustrates how these members appear in a second position; different from that shown in Figure 8.

When the slide bar 130 pivots downwardly to the position shown in Figure 11, it moves the rod 136 downwardly with it. This causes the flag 138 to become shifted in position so that the indication designated as "W" in Figure 10 becomes visible when seen from a position above the flag. As previously described, this indication may represent a heading of a vehicle in a direction having a westerly component. Similarly, the upward movement of the slide bar 130 and the rod 136 causes the indication designated as "E" in Figure 10 to become visible. This indication may represent a heading of a vehicle in a direction having an easterly component. Other apparatus similar to that described above and shown in the drawings may indicate whether the vehicle is heading in a direction having a northerly or southerly component.

The exact heading of the vehicle in the westerly or easterly direction is indicated by the cylinders 140, 142, 144 and 146. Since the cylinder 140 is fixedly mounted on the shaft 106, it rotates with the shaft. Furthermore, because of the fact that each revolution of the shaft 106 represents a change of each angular degree, the cylinder 140 indicates at any instant the particular number of minutes in the degree.

In every revolution of the cylinder 140, a pawl coupled to the cylinder engages a gear coupled to the cylinder 142 to drive the cylinder through one tenth of a revolution. In this way, the cylinder 142 indicates the value of the units digit in the representation of the number of degrees. In every revolution of the cylinder 142, the cylinder 142 in turn drives the cylinder 144 through one tenth of a revolution such that the cylinder 144 indicates the value of the tens digit. In like manner, the cylinder 146 indicates the value of the hundreds digit.

There is thus provided apparatus for counting upwardly from a minimum value such as zero to a maximum value and for automatically reversing its operation at the maximum value to count downwardly to the minimum value. When the apparatus reaches the minimum value, it again starts to count upwardly toward the maximum value. In this way, the apparatus counts on a cyclic basis between the minimum and maximum values. The apparatus is also able to count in a positive or negative direction between the minimum and maximum values. The apparatus provides the count without any lost motion even during the reversing procedure so as to obtain accurate results. The apparatus is further advantageous in that it requires a small space and a minimum number of components.

What is claimed is:

1. In combination, an input shaft, an axially movable control member having gear portions, means for obtaining an axial movement of the control member to first and second positions after particular numbers of revolutions, means for driving the control member through angular distances related to the movements of the input shaft, an output shaft, first means including gears coupling the gear portions on the control member to the output shaft for obtaining a movement of the output shaft in one direction in accordance with the rotary movements of the control members, second means including gears coupling the gear portions on the control member to the output shaft for obtaining a movement of the output shaft in the opposite direction in accordance with the rotary movements of the control member, and means associated with the gears in the first and second coupling means for obtaining a release of each coupling means from the control member at substantially the same instant as an engagement between the gears in the other coupling means and the gear portions in the control member.

2. In combination, an input shaft, an output shaft, a cam having first and second working surfaces each having a particular angular length, a cam follower, means including a control member having first and second gear portions having an effective angular length of approximately 180° and each being displaced axially from the other, said control member being axially movable to first and second positions in accordance with the disposition of the cam follower relative to the first and second working surfaces on the cam and angularly driven in accordance with the movements of the input shaft, means for converting the movements of the input shaft into corresponding movements of the cam to obtain a movement of the cam through each of the working surfaces after a particular number of revolutions of the input shaft, and means including gears disposed in driven relationship to the control member and in driving relationship to the output shaft for obtaining movements of the output shaft in one angular direction upon the axial movement of the control member to the first position and for obtaining movements of the output shaft in the other angular direction upon the axial movement of the control member in the second position.

3. In combination, an annular control member having a first gear portion disposed at a first axial position on the member and having a second gear portion disposed at a second axial position on the member, a first gear disposed in driven relationship to the control member in the first axial position of the control member for a movement of the gear in a first direction, a second gear disposed in driven relationship to the control member in the second axial position of the control member and coupled to the first gear to drive the first gear in a second direction opposite to the first direction, an input shaft, an output shaft driven by said first and second gears, means coupled to the input shaft and the control member for obtaining axial shifts of the control member to the first and second positions of the control member after particular numbers of rotation of the shaft and means actuated by said output shaft for positioning the first and second driven gears into proper alignment with their respective driving gears at the moment of axial shift of said control member.

4. In combination, an axially movable control member having a first gear portion of semi-annular configuration and a second gear portion of semi-annular configurations displaced axially from the first gear portion and displaced through a particular angular distance from the first gear portion, an input shaft, a cam coupled to the input shaft for rotary movement in accordance with the movements of the input shaft, a cam follower coupled to the cam and the control member for obtaining axial changes in the disposition of the control member in accordance with the movements of the cam and after particular numbers of revolutions of the input shaft, a first gear disposed in driven relationship to the first gear portion on the control member in a first axial position of the control member for movement in a first direction and disposed out of coupled relationship to the first gear portion in a second axial position of the control member, a second gear disposed in coupled relationship to the first gear and disposed out of coupled relationship to the second gear portion in the first axial position of the control member and in driven relationship to the second gear portion on the control member in the second axial position of the control member to drive the first gear in a direction opposite to the first direction.

5. In combination, an input shaft, a rotary cam having first and second working areas extending over approximately half of the angular lengths of the cam, means including a plurality of gears disposed in coupled relationship to the shaft and the rotary cam for driving the cam through the length of one of the working areas upon the occurrence of a particular number of revolutions of the input shaft, a control member having first and second gear portions axially displaced from each other, each of the gear portions on the control member being approximately semi-annular, a cam follower for converting the rotary movements of the cam into an axial displacement of the control member to obtain a first axial disposition of the control member during the rotation of the cam through one of its working areas and to obtain a second axial disposition of the control member during the rotation of the cam through the other working area, a first gear disposed to engage the first gear portion of the control member in the first axial disposition of the control member for a movement of the gear in the first direction, a second gear disposed to engage the second gear portion of the control member in the second axial disposition of the control member and coupled to the first gear to drive the gear in a direction opposite to the first direction, and means for providing proper engagements and releases between the different gears and the different gear portions.

6. In combination, a control member having first and second gear portions each having an effective angular length of approximately 180 degrees and each being displaced axially from the other portion, a plurality of hunting teeth on the control member one at each end of the first and second gear portions, a first gear positioned to be engaged by the first gear portion in a first axial position of the control member and having hunting teeth engageable by the hunting teeth on the control member to obtain a positive driving relationship between the first gear and the first gear portion, a second gear positioned to be engaged by the second gear position in a second axial position of the control member and having hunting teeth engageable by the hunting teeth on the control member to obtain a positive driving relationship between the second gear and the second gear portion and disposed in coupled relationship to the first gear to drive the first gear, an input shaft, a cam having first and second working areas each disposed on a different half of the cam, means including gears for driving the cam through each of the working areas upon the occurrence of a particular number of revolutions of the cam, a cam follower for shifting the control member to its first and second axial positions in accordance with the disposition of the cam in its first and second positions and at the end of the engagement between each gear portion on the control member and its associated gear, and means for obtaining an additional movement of each gear upon the engagement between the other gear and the control member to obtain a clearance between the hunting tooth on the gear and the contiguous hunting tooth on the control member.

7. In combination, an input shaft, a rotary cam having first and second working areas extending over approximately half of the angular lengths of the cam, means including a plurality of gears disposed in coupled relationship to the shaft and the rotary cam for driving the cam through the length of one of the working areas upon the occurrence of a particular number of revolutions of the input shaft, a control member having first and second gear portions axially displaced from each other, each of the gear portions on the control member being approximately semi-annular, a cam follower for converting the rotary movements of the cam into an axial displacement of the control member to obtain a first axial disposition of the control member during the rotation of the cam through one of its working areas and to obtain a second axial disposition of the control member during the rotation of the cam through the other working area, a first gear disposed to engage the first gear portion of the control member in the first axial disposition of the control member for a movement of the gear in the first direction, a second gear disposed to engage the second gear portion of the control member in the second axial disposition of the control member and coupled to the first gear to drive the gear in a direction opposite to the first direction, an output shaft reversibly driven by said first and second gears, and positioning means actuated by said output shaft for positioning the driven gears into proper alignment with their respective driving gears at the moment of axial shift of said control member.

8. In combination, an input shaft, a rotary cam having first and second working areas extending over approximately half of the angular lengths of the cam, means including a plurality of gears disposed in coupled relationship to the shaft and the rotary cam for driving the cam through the length of one of the working areas upon the occurrence of a particular number of revolutions of the input shaft, a control member having first and second gear portions axially displaced from each other, each of the gear portions on the control member being approximately semi-annular, a cam follower for converting the rotary movements of the cam into an axial displacement of the control member to obtain a first axial disposition of the control member during the rotation of the cam through one of its working areas and to obtain a second axial disposition of the control member during the rotation of the cam through the other working area, a first gear disposed to engage the first gear portion of the control member in the first axial disposition of the control member for a movement of the gear in the first direction, a second gear disposed to engage the second gear portion of the control member in the second axial disposition of the control member and coupled to the first gear to drive the gear in a direction opposite to the first direction, an output shaft having a detent thereon reversibly driven by said first and second gears, and positioning means actuated by said detent for positioning the driven gears into proper alignment with their respective driving gears at the moment of axial shift of said control member.

9. In combination, an input shaft, a rotary cam having first and second working areas extending over approximately half of the angular lengths of the cam, means including a plurality of gears disposed in coupled relationship to the shaft and the rotary cam for driving the cam through the length of one of the working areas upon the occurrence of a particular number of revolutions of the input shaft, a control member having first and second gear portions axially displaced from each other, each of the gear portions on the control member being approximately semi-annular, a cam follower for converting the rotary movements of the cam into an axial displacement of the control member to obtain a first axial disposition of the control member during the rotation of the cam through one of its working areas and to obtain a second axial disposition of the control member during the rotation of the cam through the other working area, a first gear disposed to engage the first gear portion of the control member in the first axial disposition of the control member for a movement of the gear in the first direction, a second gear disposed to engage the second gear portion of the control member in the second axial disposition of the control member and coupled to the first gear to drive the gear in a direction opposite to the first direction, an output shaft having a detent thereon reversibly driven by said first and second gears, and means actuated by said cam for holding said positioning means away from said detent in timed relation to the meshing of said driving and driven gears.

10. In combination, a control member having driving first and second gear portions each having an effective angular length of approximately 180 degrees and each being displaced axially from the other portion, an output shaft, a driven gear mounted on said output shaft adapted to mesh with one of said driving gear portions, a second driven gear on said drive shaft, an intermediate driven gear meshing with said second driving gear adapted to mesh with the driving gear portion other than the gear portion adapted to mesh with said first mentioned output shaft gear, a cam connected to said first and second gear portions adapted to axially slide said gear portions into and out of mesh with said gear on said output shaft and said intermediate gear, a drive shaft connected to said first and second gear portions and to said cam, a hunting tooth on one of said driving gear portions and a second hunting tooth on the meshing driven gear, said hunting teeth cooperating with each other as said driving gears are moved axially from disengagement with one of said driven gears and into mesh with the other of said driven gears.

11. In a reversing mechanism for driving an output shaft in one direction and after a predetermined number of revolutions of an input shaft driving said output shaft in an opposite direction the combination of a driving shaft driven by said input shaft, a driving gear portion slidably mounted on said driving shaft having a first and second set of gears having an effective angular length of approximately 180 degrees and each being displaced axially from the other, a continuous set of gears extending 360 degrees disposed between said first and second set of gears, a hunting tooth at each end of said first and second set of gears, an output shaft, a first driven gear on said output shaft positioned to be engaged by said first set of driving gears, a second driven gear on said output shaft, an intermediate gear meshing with said second driven gear positioned to be engaged by said second set of driving gears, said first driven gear and said intermediate gear being adapted to alternately be driven by said intermediate continuous set of gears, a hunting tooth on said first driven gear, a hunting tooth on said intermediate gear, said last mentioned hunting teeth being adapted to mesh with said first mentioned hunting teeth to obtain a positive mesh between the driving and driven gears, a cam driven by said input shaft, said cam having first and second working areas each disposed 180 degrees apart and intermediate portions disposed between the working areas, each intermediate portion having a relatively short angular length, a cam follower connected to said driving gear portion for shifting said gear axially on said driving shaft whereby the driving gear portion is shifted into and out of meshing engagement with the first driven gear and the intermediate gear to reversibly drive said output shaft in timed relation to the input shaft in accordance with the disposition of the cam in its first and second working areas, said output shaft having a detent thereon, positioning means actuated by said detent for positioning the driven gears into proper alignment with their respective driving gears and means actuated by said cam for holding said positioning means away from said detent in timed relation to the meshing of said driving and driven gears.

References Cited in the file of this patent

UNITED STATES PATENTS

| | | |
|---|---|---|
| 1,172,547 | Moon et al. | Feb. 22, 1916 |
| 1,199,308 | Sanders | Sept. 26, 1916 |